Figure 1:
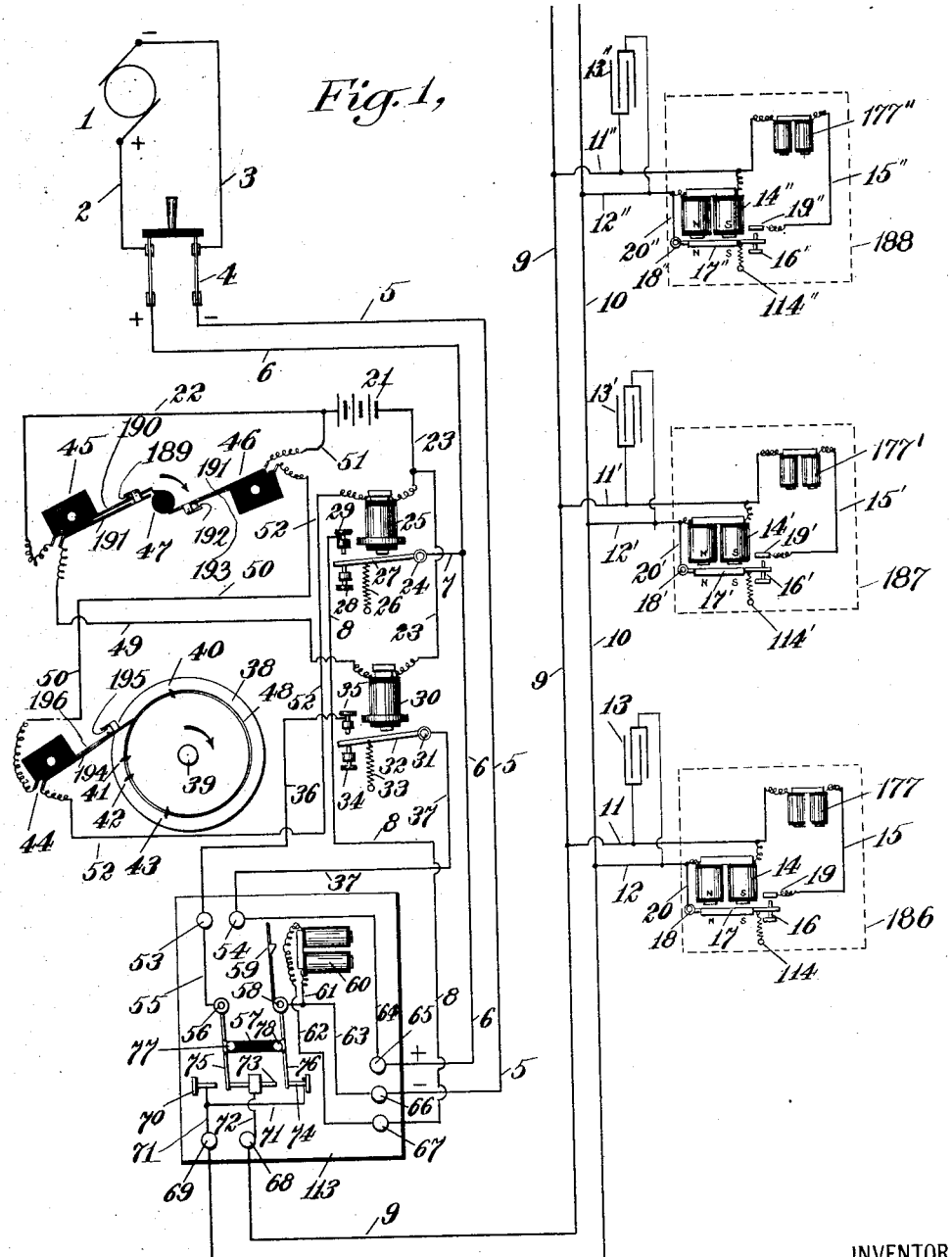

J. W. BRYCE.
SYSTEM FOR OPERATING TIME RECORDERS OR TIME INDICATORS.
APPLICATION FILED JUNE 18, 1909.

1,173,338.

Patented Feb. 29, 1916.
5 SHEETS—SHEET 1.

J. W. BRYCE.
SYSTEM FOR OPERATING TIME RECORDERS OR TIME INDICATORS.
APPLICATION FILED JUNE 18, 1909.
1,173,338.
Patented Feb. 29, 1916.
5 SHEETS—SHEET 2.
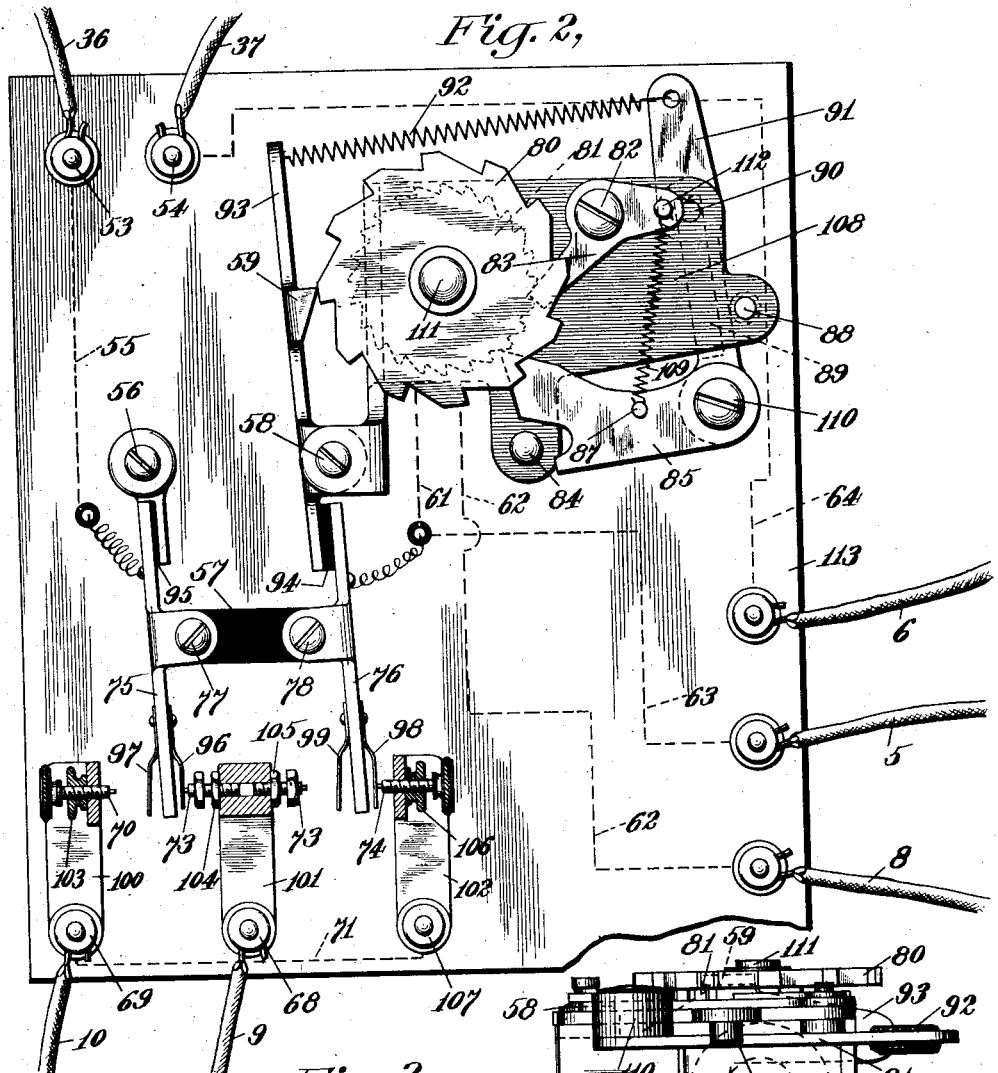
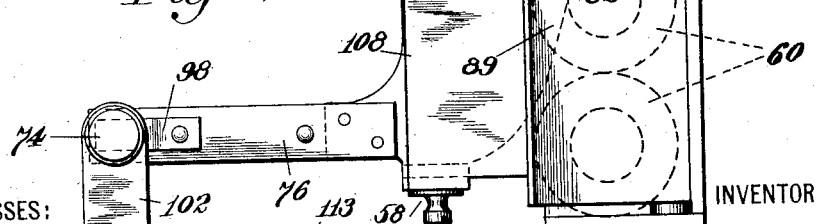

J. W. BRYCE.
SYSTEM FOR OPERATING TIME RECORDERS OR TIME INDICATORS.
APPLICATION FILED JUNE 18, 1909.
1,173,338.
Patented Feb. 29, 1916.
5 SHEETS—SHEET 3.
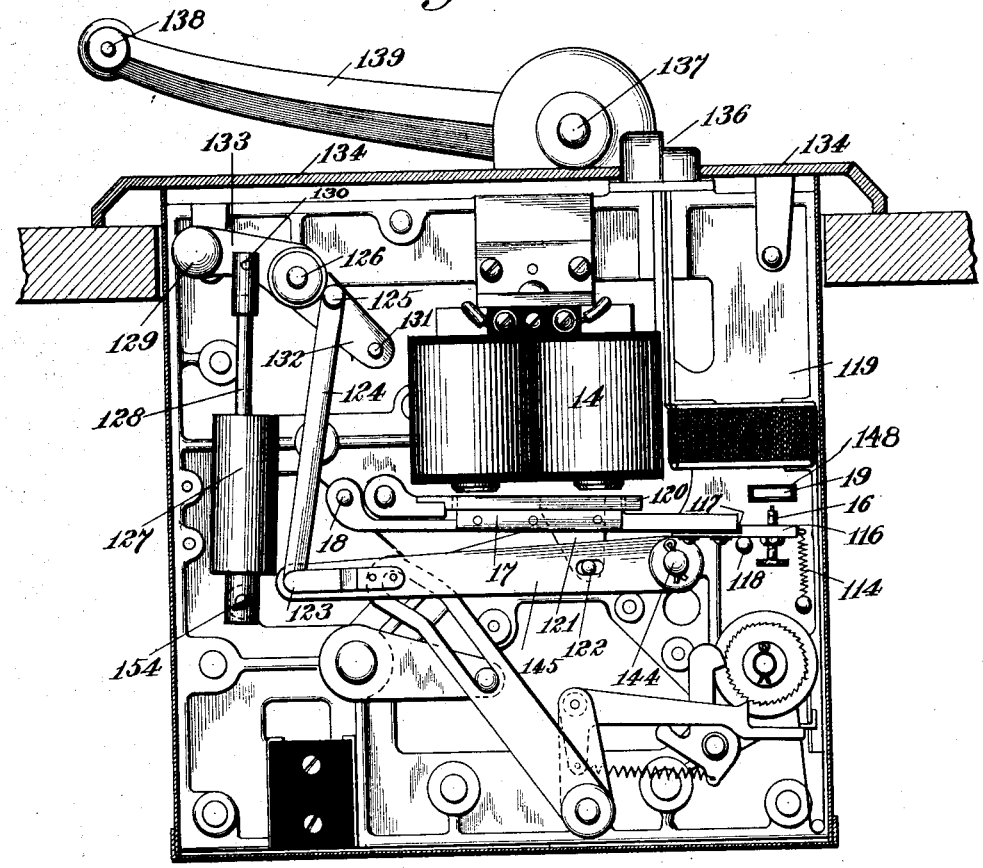
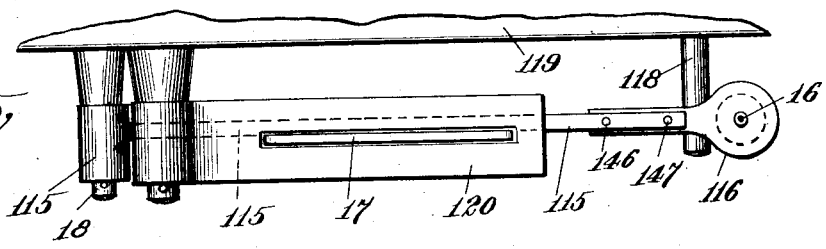
WITNESSES:
INVENTOR
James W. Bryce,
BY
Kenyon & Kenyon,
his ATTORNEYS

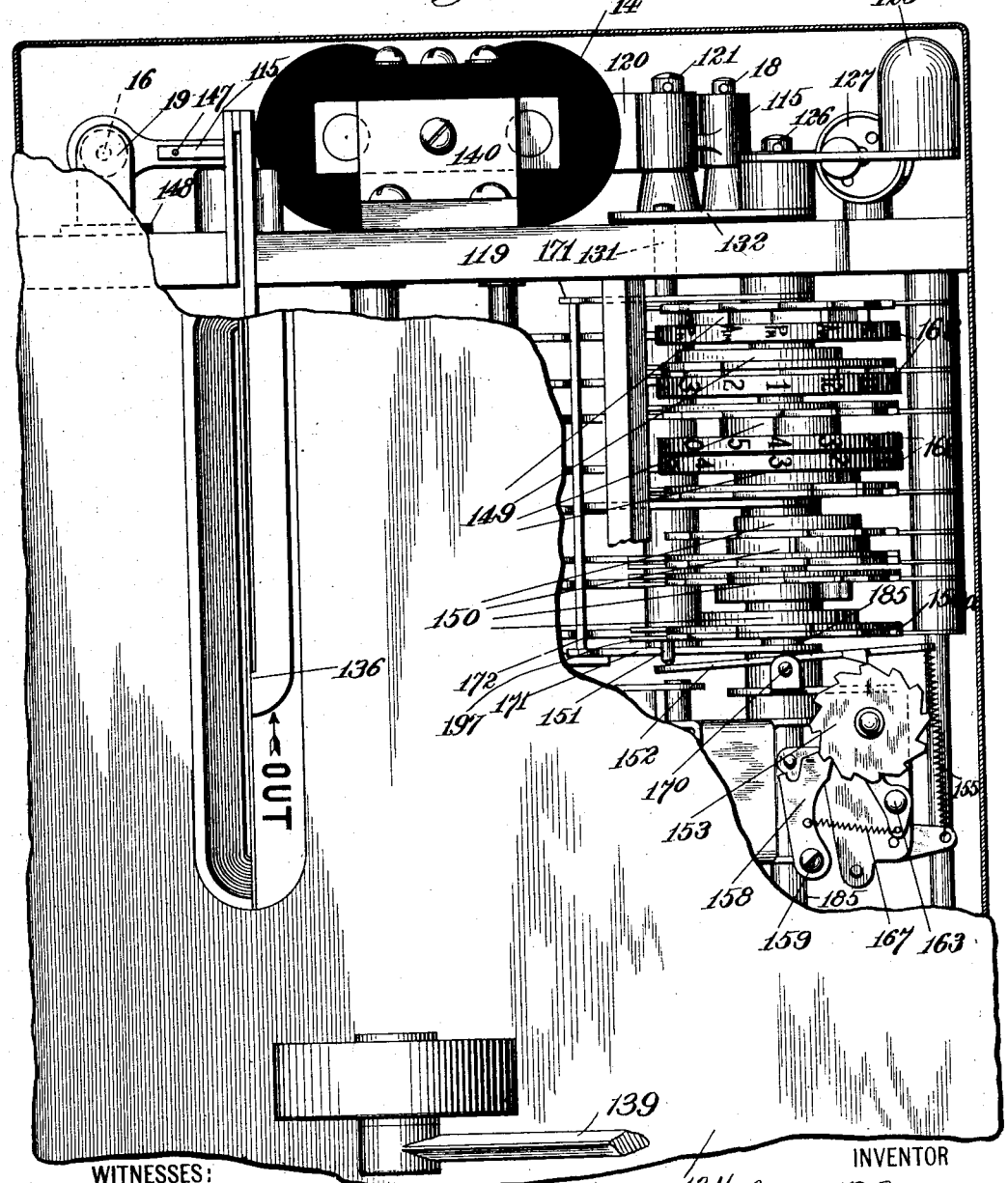

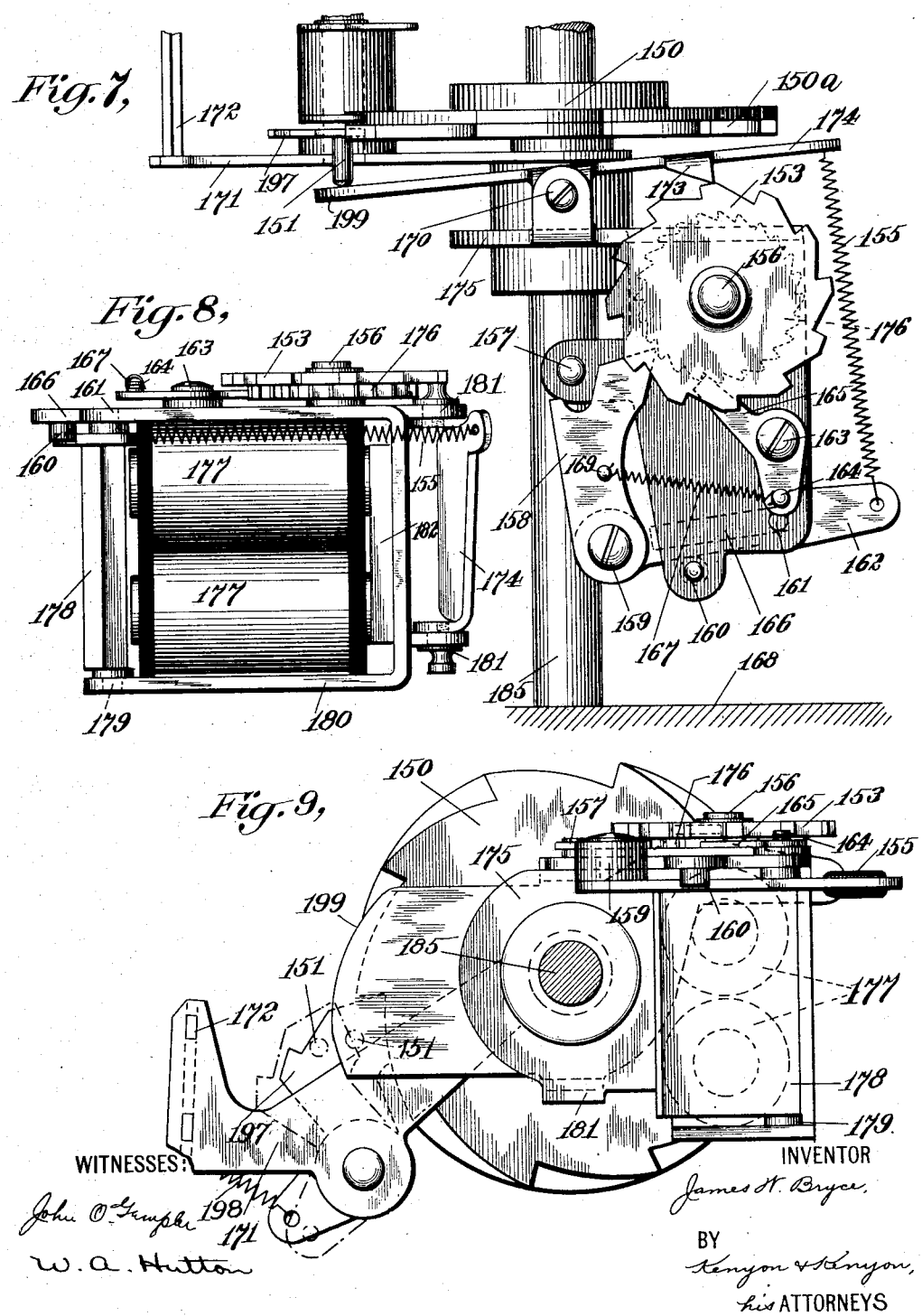

UNITED STATES PATENT OFFICE.

JAMES W. BRYCE, OF BROOKLYN, NEW YORK, ASSIGNOR TO INTERNATIONAL TIME RECORDING COMPANY OF NEW YORK, OF ENDICOTT, NEW YORK, A CORPORATION OF NEW YORK.

SYSTEM FOR OPERATING TIME-RECORDERS OR TIME-INDICATORS.

1,173,338.   Specification of Letters Patent.   Patented Feb. 29, 1916.

Application filed June 18, 1909. Serial No. 502,894.

*To all whom it may concern:*

Be it known that I, JAMES W. BRYCE, a citizen of the United States, and a resident of Brooklyn, in the county of Kings and State of New York, have invented certain new and useful Improvements in Systems for Operating Time-Recorders or Time-Indicators, of which the following is a specification.

My invention relates to systems for operating time recorders or time indicators.

It has for its object to provide a new and improved system for operating one or more time recorders or time indicators; to simplify the circuits and connections needed in such a system; to carry on such a system with a two-wire circuit; and generally to simplify, improve and cheapen the connections and appurtenances and the operation of such a system.

It consists in the novel devices and combinations herein shown and described.

In the accompanying drawings forming part of this specification, my invention is shown as embodied in a system for operating a plurality of elapsed time recorders, but it is not limited to use with such machines or to use with a plurality of machines.

The particular construction of the time recorders or indicators used in my system forms no part of the invention, but as the invention is of value in connection with elapsed time recorders, I have shown such machines in the drawings.

My invention is useful and may be adapted for use with any suitable time indicating or recording machine and with a single machine or any number of machines.

In the accompanying drawings I have shown my invention in its preferred form, and as embodied, as previously stated, in a system containing a plurality of elapsed time recorders.

Referring now to such specific embodiment and the drawings illustrating it, Figure 1 is a diagram of the preferred form of circuits used in such a system. Fig. 2 is a plan detail view of the reversing switch and connecting mechanism. Fig. 3 is an end view of the same parts. Fig. 4 is a vertical section taken just inside of the case of an elapsed time recorder of the form that I prefer to use in such a system as is disclosed herein. This figure gives a side view of the two armatures of the main impulse magnet of the recorder. Fig. 5 is a detailed plan view of both of the armatures of the magnet. Fig. 6 is a top view of the same recorder with the top plate broken away to show how the recorder is equipped for use in the system. Figs. 7, 8 and 9 are detailed views of cut-out mechanism preferably used in such machines, Fig. 7 being a plan of such mechanism, Fig. 8 a side view and Fig. 9 an end view of the same.

In the system illustrated in Fig. 1, three elapsed time recorders are represented by the dotted lines 186, 187 and 188. As the particular construction of these machines forms no part of the present invention, except in one or two particulars, the full construction and details of the machines are not shown in the drawings and will not be described, only enough of the parts being shown to illustrate the application of my invention to such machines. Such parts of the machines will be referred to more fully later on.

The wires 9 and 10 and their connecting parts form the main operating circuit. It will be noted that this is a two-wire circuit. This forms the main advantage of my improvement, as heretofore in the operation of systems of the general character described herein, it has been found necessary to use three wires. The main operating circuit also contains reversing means for sending the current through the circuit in one direction or the other for predetermined intervals of time. The particular means shown for this purpose consist of a reversing switch, consisting of the contact levers 75 and 76 and connecting parts. 1 represents the source of electric energy for use in the main operating circuit. 2 is the wire from the plus pole and 3 from the negative pole of the source, 4 a hand switch and 5 and 6 the two wires of the circuit connecting with binding posts 65 and 66 of the reversing switch. The remaining parts of the main operating circuit will be described in detail later on.

In each time recorder or indicator in the system I provide magnetic means for operating the time mechanism of such machine, so constructed or arranged as to operate a certain part of the time mechanism at each flow of the current through the main operating circuit and the magnetic means of the machine, irrespective of the direction of such current flow, so that such part of the time mechanism will be always operated at every electrical impulse sent through the operating circuit, and so as to operate another part of the time mechanism of the said machine when the current flow is in one direction, but not to operate such part when the current flow is in the opposite direction. For example, in the particular elapsed time recorders shown, the part of the time mechanism which is always operated at every current flow through the circuit consists of time-of-day indicating and recording wheels, whereas the part of the time mechanism which is operated at times, when the current flow is in one direction, but not operated at other times, when the current flow is in the opposite direction, consists of elapsed time recording wheels. By these means, the latter part of the time mechanism is cut into or out of operation at predetermined points of time and for predetermined intervals of time. And this is done with a main operating circuit consisting of two wires only, as already described. The magnetic means shown in the drawing for accomplishing this result consist of a magnet 14 provided with two armatures, one armature 120 (Fig. 4) adapted to be attracted by its magnet 14 at each energization and connected so as to operate the time mechanism of the machine, and a second polarized armature 17 (Figs. 4, 5 and 1) adapted to be attracted by magnet 14 when the current flow through the magnet is in one direction, but not to be attracted when the flow is in the other direction, and adapted in one of its positions to disconnect the first armature from a part of the time mechanism it normally controls. The first armature 120 in the elapsed time recorder illustrated in the drawings is connected with all of the time mechanism of the recorder and normally operates all of it, both time-of-day and elapsed time. When the current flow, however, is in the direction to cause magnet 14 to attract polarized armature 17, the latter is so constructed and arranged as to actuate a suitable cut-out device, to be presently described, to cause the cut-out device to operatively disconnect the first armature from part of the time mechanism, as shown from the elapsed time mechanism. In this way the elapsed time mechanism will be operated at certain periods of time and will not be operated at other periods of time. The cut-out device referred to is controlled by polarized armature 17 through cut-out magnet 177. Each of the other instruments in the system, 187, 188, etc., is of course provided with similar magnets, armatures and connecting devices. The magnet of instrument 187 is 14′, its polarized armature 17′ and the cut-out magnet 177′; the magnet of instrument 188 is 14″, its polarized armature 17″ and its cut-out magnet 177″.

The means shown for operating the reversing switch are, preferably, magnetically controlled. These are adapted, when energized, to move the reversing switch from one of its positions to its other position, the reversing switch being held in whichever position it is moved to. I provide clock-controlled means for actuating this magnetic control of the reversing switch, so that such control shall be exercised at predetermined points of time, but preferably between the beats of time when the main circuit controller is actuated.

The means for operating the main circuit for controlling the electrical impulses sent through it consist, preferably, of a secondary circuit, provided with a circuit controller, clock-controlled and actuated at regular beats of time, for operating a circuit controller in the main operating circuit. As shown, this secondary circuit is one provided with a battery 21 and the clock-controlled circuit controller is represented at 47; the circuit controller in the main operating circuit controlled by the secondary circuit is armature 32 of magnet 30 in the secondary circuit. When magnet 30 is energized, armature 32 is attracted and the main operating circuit is then closed by armature 32, making contact with contact point 35. Magnet 30 is energized at predetermined points of time. As shown, it is energized every minute by means of insulated disk 47 mounted on the second arbor of a clock movement (not shown), the single tooth of wheel 47 causing contacts 189, on arm 191, to make contact with arm 190 for an instant when arm 191 drops off the tooth of wheel 47. The moment when arm 190 drops off the tooth, the contact is broken and the contacts remain separated until the tooth again causes them to make contact.

The complete main operating circuit in the normal condition of the system runs as follows. From source 1 through wire 2, switch 4, wire 6, binding post 65, on board 113, wire 64, binding post 54, wire 37, armature 32 pivoted at 31, pulled upward against tension of spring 33 away from its back stop 34 against contact pin 35, wire 36, binding post 53, wire 55, arm 75 of the reversing switch, pivoted at 56, contact 73, wire 72, binding post 68 and out through main wire 9, back through main wire 10, binding post 69, wire 71, contact 74, the other arm 76 of the reversing switch pivoted at 58, wire 63, binding post 66, wire 5, switch 4, wire 3, back to source 1. At each revolution of wheel 47, this circuit is made and immediately thereafter broken through armature 32, sending electrical impulses through the main operating circuit every minute, and feeding the time mechanism in the different instruments every minute.

In the normal condition as just described, current flows from wire 6 and binding post 68, through wire 9 and back through wire 10, wire 9 being connected with the plus side of the source of electrical energy. The direction of this flow is changed when the reversing switch 75 and 76 is thrown to its left-hand position, as viewed in Fig. 1. For this purpose, arms 75 and 76 are connected by an insulated link 57 pivoted at 77 and 78 to the two arms, so as to make a flexible structure. In this position of the reversing switch, the electrical impulses are sent in the reverse direction through the main operating circuit, in this case wire 6 from the plus side of the source being connected through arm 75 of the reversing switch and contact 70, wire 71, binding post 69 with wire 10, thus causing the flow to be out through wire 10 and back through wire 9, wire 9 being now connected through contact 68, wire 72, and the right-hand end of contact pin 73 with arm 76 of the switch and thence with binding post 66, wire 5, with the minus side of the source.

In the normal condititon, when the current flows out through wire 9, magnet 14 and its polarized armature 17 are so constructed that armature 17 will not respond. But when the current flows in the opposite direction, it will respond and operate the cut-out device, referred to above, and either connect or disconnect the elapsed time mechanism with operating armature 120, as will be presently described. The letters "N" and "S" on the magnet 14 and armature 17 indicate the normal relative magnetic condition of the two when the current flow is out through wire 9 and back through wire 10. Of course, when the current flow through magnet 14 is in the reverse direction, the polarity of its poles will be reversed and armature 17 will be attracted, operating the cut-out device.

Reversing switch 75 and 76 is moved from one position to another by means of magnet 60, which is energized at predetermined points of time. The means for moving the switch, actuated by magnet 60, are arranged so that the switch will be held in either position to which it is moved. The means for thus moving and holding the switch will be described in detail later on.

The means for energizing magnet 60 are clock-controlled so as to actuate it only at predetermined points of time. The specific apparatus shown for this purpose consists of two circuit controllers, in addition to contacts 189 and 190, at 45. The first of these additional circuit controllers, or the second circuit controller, considering that of 45 as the first, is represented at 46, and the other or third circuit controller, is illustrated at 44. That at 46 consists of two arms, arm 191, carrying contact point 192, and arm 193 constructed and operated substantially like 191, 189 and 190. Both are operated by the single tooth of disk 47. The two sets of contacts, however, are arranged at opposite sides of the disk, so that the operation of contacts 192 and 193 will be between successive actuations of the other contacts, or in other words, between successive impulses sent through the main operating circuit. This is done in order to prevent interference. The third circuit controller at 44 is similarly constructed of arm 194 carrying contact 195 and arm 196. These contacts of the third circuit controller are, as shown, arranged in series with those of the second circuit controller at 46. They are brought into contact by means of a clock-controlled contact wheel 38, having mounted on it in the groove 48 insulated contact pieces 40, 41, 42 and 43. Wheel 38 is mounted on a shaft 39 connected with the clock movement (not shown) actuating disk 47. Contact wheel 38 is so connected with the clock movement as to be rotated once every twenty-four hours. The contact pieces may be arranged on its surface at any desired points. As shown, contact 40 is arranged upon the disk of the wheel at a point representing 7 a. m., 41 at 12 noon, 42 at 1 p. m. and 43 at 5 p. m., wheel 38 revolving, as shown by the arrow in Fig. 1. When each contact strikes the contact arms 194 and 196, it brings the contacts 195 and 196 together, and preferably holds them together for a time equivalent to a complete revolution of disk 47 for a purpose presently to be described. Contacts 40, 41, 42 and 43 are made of insulating material. It will be seen, therefore, that at 7 o'clock, 12, 1 and 5, contact will be made between 195 and 196. As this contact lasts during a complete revolution of disk 47 and as the contacts at 44 and 46 are in series, both breaks in the circuit will be closed whenever any of the contacts of wheel 38 are in contact with the arms 194 and 195, and the tooth of disk 47 strikes the end of the arms 191 and 193. A circuit is then closed through a magnet 25, attracting its armature 27, and closing a circuit through the reversing-switch controlling magnet 60. Thus at a predetermined interval of time, depending upon the location upon contact wheel 38 of the different contacts, the reversing lever will be thrown from its normal position shown in Fig. 1 to its other position, causing the current flow in the main operating circuit to be reversed, and armature 17 to be attracted and magnet 177 to be energized, and the cut-out device operated, as already described.

The circuits through the three circuit controllers at 45, 46 and 44 respectively, consist in full as follows. That through main circuit controller 45 runs from one side of battery 21, through wire 22, arm 190, contact 189, arm 191, wire 49, magnet 30, wire 23, back to battery 21. That through the second circuit controller at 46 and the third circuit controller at 44 is from one side of battery 21, through wire 51, 191, 192, 193, wire 50, 196, 195, 194, wire 52, magnet 25, wire 23 back to battery. Insulated blocks are shown at 45, 46 and 44 for supporting the contact arms.

The circuit through magnet 60 is as follows. From source of power 1, wire 2, switch 4, wire 6, 7, armature 27, pivoted at 24 and attracted by magnet 25 from its back stop 28 against the tension of spring 26, contact 29, wire 8, binding post 67, wire 62, magnet 60, wire 61, 63, wire 5, switch 4, wire 3 back to the source. Magnet 60 is preferably connected with the main source of power of electric energy 1 in order to get the necessary strength of magnetic pull derived from a stronger source than is the case in the secondary circuit. Lever 59, pivoted at 58, is the means for throwing the reversing switch. The means by which it is actuated from magnet 60 will be presently described.

From the above it will be seen that every minute the contacts at 45 are closed, and that energizes magnet 30, closing the break at 32 and 35 in the main operating circuit, and sending an impulse out through the circuit. This energizes each magnet 14, 14', 14'', etc., attracting its main armature 120, etc., and this energizes the time feeding mechanism. The flow of current is normally out through 9 and back through 10. With the flow in this direction, magnets 14, etc., operate all of the time mechanism of their respective machines.

When one of the contact pieces of contact wheel 48 strikes arms 194 and 196, at the next succeeding closing of the circuit at 46, magnet 25 is energized and this energizes magnet 60, which throws the reversing switch to its opposite position, changing the flow of current through the main operating circuit, so that the current flows now out through 10 and back through 9. This operates polarized armature 17, which energizes cut-out magnet 177, and the cut-out mechanism is operated to connect or disconnect the elapsed time mechanism from the actuating armature 120. This either starts into operation or stops the elapsed time mechanism. The parts are so arranged that when contact 40 of wheel 38 makes contact with arms 194 and 196, the cut-out device will operatively connect armature 120 with the elapsed time mechanism and cause it to start into operation. As the cut-out device is held in the position into which it is moved, the elapsed time mechanism will remain in operation until contact 41 makes contact with arms 194 and 196, when the cut-out device will be again operated to disconnect the elapsed time mechanism and cause it to stop. Similarly at 42 it is started into operation and at 43 is stopped. Thus the elapsed time mechanism will be operative to add elapsed time only during working hours.

The circuit through cut-out magnet 177, when polarized armature 17 is raised, runs as follows. From wire 9 through wire 11, magnet 177, wire 15, contacts 19 and 16, polarized armature 17 pivoted at 18, and raised against the tension of its spring 114 away from its back stop 118, wire 20 and wire 12 to wire 10. 13 is an ordinary condenser connected in the usual way to the wires 11 and 12. Instruments 187 and 188 have parts corresponding in all respects to those described for 186, and in Fig. 1 the parts, as shown, are given corresponding numbers, with the addition of a prime to each figure for instrument 187 and a second to each figure for instrument 188.

As the reversing switch and the cut-out device to be hereafter described, are both held when moved into either position, it is necessary after each actuation of cut-out magnet 177 and the throwing of the cut-out device to its other position, to prevent the next electrical impulse through the main circuit from again actuating magnet 177 and throwing the cut-out device back to its initial position. For this purpose, the contacts 40, 41, 42 and 43 of contact wheel 38 are made long enough so that they will hold contacts 195 and 196 together, at least a complete revolution of disk 47, so that the tooth of that disk will make contacts 192 and 193 close twice, the second closing again operating magnet 60 and throwing the reversing switch back to its initial or normal position shown in Fig. 1. Otherwise the next impulse sent through the main operating circuit from the contacts at 45 would throw the cut-out device back to its position at once, thus nullifying its former movement. In this way, I arrange it so that the reverse flow of the current will take place through magnets 14, 14', etc., only for one impulse and then the circuit will be restored to its normal position with the current flowing out through 9 and returning through 10. Armature 32 of magnet 30 is pivoted at 31 and raised against the tension of spring 33 away from its back contact 34.

I will now describe the specific mechanism shown in Figs. 7, 8 and 9 of the cut-out mechanism for cutting the elapsed time mechanism of the instrument 187 out of or into operation. In this connection, I will first briefly describe the elapsed time recorder 187. This is only illustrated generally in the drawings, especially in Figs. 4, 5 and 6, except the details connected with the magnet and its armatures, as the detailed construction of such a machine forms no part of my present invention.

Referring to Figs. 4, 5 and 6, the instrument there shown is one provided with time mechanism of two sorts, one for purposes of indicating time-of-day and the other for indicating elapsed time. Fig. 6 shows a part of such a machine, 136 representing a card slot for the insertion of a card into the machine to have the suitable time records printed upon it, 139, 138 representing the operating handle pivoted at 137 in the framework 134. The actual time recording wheels are not shown. The only part of the time mechanism that is shown are the four timing cams 149 which actuate suitable time-of-day recording wheels (not shown), time-of-day indicating wheels 168, 168, and timing cams 150, 150 for actuating suitable elapsed time recording wheels (not shown). The means by which the timing cams drive the respective recording wheels are not shown for reasons already given, nor are all of the connections between armature 120 of magnet 14, by which it feeds forward every minute the minute cam 149 and 150 of the two sets of timing cams. Part of these are indicated in Fig. 4 and consist of a dependent lug 121 from armature 120, with a pin 122 entering a slot in lever 145 pivoted at 144 to side frame 119 and having pivoted at its outer end, at 123, a link 124 pivoted at 125 to a lever 132. This lever 132 has secured to it a rod 131, see Fig. 6, which carries a frame 171, 172 provided with feeding pawls for feeding forwardly different timing cams. These are not shown, except the pawl 197 for the minute elapsed time cap, as they form no part of the present invention, and are elsewhere shown in full and claimed, more particularly, in my application for Letters Patent Serial No. 497,005, filed May 19, 1909. Of course, any suitable mechanism could be employed for these purposes. 127 represents a dash-pot pivoted to the framework at 154, its piston 128 being pivoted at 130 to the other arm 133 of lever 132 which is pivoted to frame 119 at 126 and 129 being a counterweight to assist the armature in the operation of the parts. The operation of armature 120 normally causes the timing cams, both the time-of-day timing cams 149 and the elapsed time timing cams 150, to be fed forward in any well known manner so as to represent by their condition the proper time represented by the clock movement controlling the system. The time-of-day timing cams are operated at every actuation of armature 120 and, as already described, this armature is actuated at every electrical impulse sent through the main operating circuit 9 and 10, irrespective of the direction of flow of the current. Accordingly, the time-of-day timing cams 149 are fed all the time. The elapsed time timing cams 150, however, are fed only during working hours, as has been already described. In order to prevent their being fed at other times by armature 120 and connecting parts, I provide a cut-out device which is illustrated in Figs. 6, 7, 8 and 9, which I will now describe. This is accomplished through cut-out magnet 177, which serves to cut in and out clutch mechanism forming part of the connection between armature 120 and the feeding pawls for the timing cams.

197 is an actuating pawl for feeding forward the minute elapsed time timing cam 150 at each impulse of the main operating circuit. This is operated from armature 120 through a feeding frame consisting of two arms 171 connected by a cross bar 172 and loosely pivoted on shaft 185. This frame is rocked up and down through rod 131 by connections not shown, at each energization of magnet 14. Pawl 197 meshes with a ratchet wheel 150$^a$ fast with the elapsed timing cam 150. Of course, each timing cam, both elapsed timing cams and time-of-day timing cams, is provided with a corresponding feeding pawl, all of them being loosely mounted on a shaft 185 extending between and supported by sides 171 of the feeding frame and each timing cam has a corresponding ratchet wheel connected to it. By any suitable means, such as that shown in my application above referred to, the minute timing cam feeds forward the next timing cam of higher denomination, and then the next in any well known manner.

198 represents a spring for the pawl to hold it in engagement with its ratchet. Elapsed time minute feeding pawl 197 has a pin projecting sidewise from it 151. The normal position of this pin is that of the right-hand dotted lines 151 of Fig. 9, pawl 197 being in full lines. In this position, the pawl engages the teeth of ratchet 150$^a$ and at every actuation of the frame 171, as already described, the pawl rises and feeds ratchet wheel 150$^a$ forward and with it the minute elapsed time timing cam 150. This is the position of the parts during working hours, and while the pawl and pin are in this position, all of the elapsed time timing cams are fed forward. They are in this position from the time that contact 40, contact wheel 38 (Fig. 1) passes contact arms 194 and 196 until contact piece 41 closes the contact between 195 and 196, as already described. Immediately at the end of the next operation of pawl 197, cam surface 199 snaps beneath pin 151 when in its uppermost position and when this pin is moved downwardly with its pawl, it rides outside and on the exterior surface of cam 199. In Fig. 9 it is shown in this position by the left-hand dotted lines 151 and pawl 197 is shown in this left-hand position by dotted lines. Cam 199 is a movable arm pivoted at 170 to ears 181—181 of piece 175 mounted on shaft 185. On each succeeding actuation of pawl 197 pin 151 rides upward and downward on the exterior surface of cam 199, thus keeping its pawl 197 out of engagement with ratchet wheel 150ª. This, by any well known means, keeps the pawls of the ratchet wheels of the elapsed timing cams of higher denomination also out of contact with their respective ratchet wheels. The mechanism for this is not shown. Accordingly, none of the elapsed time timing cams are fed forward during this period. This lasts until the next contact-piece 42, of contact wheel 38, causes contact to be made between 195 and 196, whereupon pawl 197 and the other pawls of higher denomination again resume their normal position and begin to feed their respective ratchets and the timing cams accordingly. When contact piece 43 brings contacts 195 and 196 together, pin 151 again snaps over cam surface 199 and the pawl 197 and the higher pawls are again thrown out of operative position.

The means for throwing the pin 151 into the one or the other of these two positions are shown in Figs. 7, 8 and 9 and are as follows. It consists of the electro-magnet 177, which is supported by the bent metal piece 175, which encircles shaft 185, upon which the cams of the time-of-day mechanism and the elapsed time mechanism are located. The piece 175 is bent out so as to form bearings 161 in the ears 166 for the armature 178. This armature is kept from the magnet by the tension spring 155. Armature 178—162 is pivoted at 179—161 to the frame 180. This spring 155 is fastened at its other end to lever 174, which is provided with a cam wiper 173 and carries at its other end cam surface 199. Lever 174 is pivoted at 170 to the stationary piece 175, and has a cam part 199 that at times engages the pin 151, as described. Also fast to the armature 178—162 is a pawl 158 pivoted at 159 and having a tension spring 167 to hold the end of the pawl in contact with ratchet 176. A stud 157 is securely fastened to the sheet supporting member 180 for the nose of the pawl 158 to engage with to prevent overthrow. The ratchet 176 is fastened to the cam wheel 153 and they are loosely mounted on stud 156, which is fastened to the supporting member 180, as shown. A click pawl 165 is pivoted at 163 to engage ratchet 176 and is kept in that position by tension spring 167, secured to it at 164 and to pin 169 on pawl 158 to prevent backward rotation. A stop pin 160 is arranged to keep the armature in position. As will be seen from Fig. 7, there are twice as many teeth in the ratchet 176 as there are rises on the cam 153; consequently every time the magnet 177 operates, pawl 158 will feed the ratchet 176 forward one tooth, and the lever arm 174 alternately left on a rise or opposite a depression of cam 153. When magnet 177 is thus energized with pawl 197 and its pin 151 in its normal position, that is, with the pawl engagement with its ratchet 150, and cam wiper 173 comes opposite to a depression in cam wheel 153, the cam wiper cannot move down into the depression because the side of its cam surface 152 rests against the end of pin 151 and holds the lever 174 in the position shown in Fig. 7. But on the next upward movement of pawl 197 and pin 151, the latter pin rises over the sloping surface of cam 199, whereupon lever 174 is pulled by spring 155 so that cam wiper 173 moves downward into a depression of the cam 153 and the upper sloping surface of cam 199 moves under pin 151. At the next downward movement of pin 151 and its pawl 197, the pin rides on the outer surface of cam 199, as already described, and continues to ride on it in its upward and downward movement, thus keeping pawl 197 and the pawls of the higher timing cams out of engagement with their respective ratchets, until the next contact piece on contact wheel 38 again energizes magnet 177, whereupon cam wiper 173 of lever 174 is pushed outward by a rise of the cam 153 and cam surface 199 is swung to the side of pin 151. Thereupon spring 198 of pawl 197 throws the pawl and pin into their right-hand position shown in Fig. 9, thus throwing the pawl and the pawls of higher denomination into engagement with their respective ratchet wheels. The timing cams are then fed until pin 151 again throws pawl 197 out of engagement in the manner already described.

I will now proceed to describe the means by which magnet 60 throws the reversing switch, to wit, from one position to another, and the means by which it is held in each position until the next actuation of magnet 60. The devices for this purpose are in all substantial respects the same as those already described for throwing in and out the cut-out mechanism for connecting and disconnecting the elapsed timing cams with the driving means. The devices for this purpose are especially illustrated in Figs. 2 and 3. As there shown, the reversing switch has fastened to its arm 76 a lever 93, pivoted at 58 in the framework and provided with a cam surface 59, the lever and cam surface corresponding in all substantial respects to lever 174 and cam surface 173 of the cut-out mechanism. 94 is an insulated block interposed between levers 93 and arm 76. Magnet 60 is provided with an armature 89, 91, pivoted at 90 to frame 108. Spring 92 connects the outer end of it with lever 93 and holds armature 89 against its stop 88. To the lower end of armature 91 is pivoted at 110 a pawl 85, the pawl engaging ratchet wheel 81 fast with cam disk 80, both loose on stud 111 and having stop pin 84. These parts correspond to pawl 158, ratchet 176 and cam 153 of the cut-out mechanism. 83 is a pawl pivoted at 82 and provided with spring 109 secured to pin 87 on pawl 85 to prevent backward rotation. The operation of the parts is in all respects similar to the corresponding parts in the cut-out mechanism. Thus at each actuation of magnet 60, ratchet wheel 81 is fed forward one tooth and cam wheel 80 is moved forward so that alternately a rise in the cam and a depression come opposite cam surface 59 of lever 93. This rocks lever 93 and with it the reversing lever alternately from one position to another with each energization of magnet 60.

The arm 76 of the reversing switch has mounted on it the yielding contact fingers 98 and 99 and the arm 75 has the yielding contact fingers 96 and 97. Arm 75 is insulated from its pivot by insulating block 95.

Binding post 69 has mounted with it plate 100 holding contact 70 which is adjusted by nut 103. Similarly binding post 107 has mounted with it plate 102 which carries contact 74 adjusted by nut 106. Binding post 68 has mounted with it plate 101 which carries contacts 73—73 adjusted by nuts 104 and 105.

The polarized armature 17 is composed of bar 115 which has at its right-hand end Fig. 4, piece 116 carrying contact screw 16 and is insulated from 115 by insulating piece 117 and held by screws 146—147. Contact 19 is fastened to insulating block 148 which is fastened to frame.

By means of my improvement, two sets of time mechanism may be employed in any one or more of the time indicators in the system and part of the time mechanism, as for example, time-of-day mechanism, may be fed always, and another part of the time mechanism, as for example, elapsed time mechanism, may be fed only at certain predetermined intervals of time, such for instance as the working hours of each day, and this is accomplished by means of an operating circuit having only two wires. By my improvement, such a system is made much simpler and more effective, and the cost of its installation and maintenance is materially reduced.

It will, of course, be understood that many changes from or modifications in the device shown in the drawings may be made without departing from my invention. Thus for instance, instead of using a magnet with two armatures, the one operated at all times and the other constructed so as to operate only upon a reversal of the current in the circuit, two separate magnets with separate armatures could be employed, one responsive to every impulse of current through the system and the other responsive only to certain of the impulses, as for example, by the use of an ordinary magnet and armature and a polarized magnet or armature or other equivalent device. Thus also, for example, the separate cut-out magnet 177 might be dispensed with and the work of actuating the cut-out mechanism be performed directly from the polarized armature 17 or its equivalent.

While I prefer that the circuit controllers represented at 46 and 44 in Fig. 1 should be in series with each other, this is not essential, nor is it essential that two circuit controllers be provided for this purpose, as the work, with suitable modifications, could be accomplished by one. Again, for example, the electric power used in the mechanism might, if desired, be drawn from one source instead of from two, as shown. In many other ways than those above specifically indicated, the devices of the drawings could be changed or modified without departing from my invention.

While any suitable circuit or current may be employed for making part of the magnetic means responsive at one time and not responsive at another time, I prefer in practice, to use a reversal of current for this purpose.

What I claim as new and desire to secure by Letters Patent, is:—

1. The combination with a time indicating device comprising, a time of day indicating mechanism and an elapsed time indicating mechanism, of magnetically actuated means for controlling the operation of both mechanisms, a circuit including said means, and a current reverser therein, the magnetic actuating means being adapted to be disconnected from the control of the elapsed time mechanism by a current in one direction, but to operate the time of day mechanism by currents in either direction.

2. The combination with a time indicating device, comprising a time of day indicating mechanism and an elapsed time indicating mechanism, of means for controlling the operation of both mechanisms, a magnet for actuating the same, a source of current, a circuit including the magnet, and a current reverser adapted to be actuated at predetermined intervals of time for sending currents from either pole of the source through the circuit, the said magnetically actuated controlling means being adapted to be disconnected from the control of the elapsed time mechanism by currents in one direction, but to operate the time of day mechanism by currents in either direction.

3. In a time indicating machine, the combination of time mechanism and magnetic means for operating the same, a cut-out device for operatively disconnecting or connecting the operating magnetic means, and a part of the time mechanism normally driven by it, a circuit for controlling said magnetic means, and reversing means for sending the current through said circuit in one direction or the other, the magnetic means and cut-out being so constructed and arranged that the magnetic means will operate all of the time mechanism, when the flow of current is in one direction, but will be disconnected by the cut-out device from a part of the time mechanism, when the flow is in the opposite direction, and will then operate only the other part of the time mechanism.

4. In a time indicating machine, the combination of a time mechanism, a magnet, an armature therefor for controlling the operation of the time mechanism, said magnet being adapted to be attracted at each energization of the magnet, a cut-out device for operatively disconnecting or connecting the said armature and part of the time mechanism normally controlled by it, a second and polarized armature adapted to be attracted by the magnet when the flow of current through the same is in one direction, but not to be attracted when the flow is in the other direction, and adapted in one of its positions to actuate the cut-out device to cause it to operatively disconnect the first armature and the said part of the time mechanism, a circuit through the magnet, and reversing means for sending the current through said circuit in one direction or the other, whereby all the time mechanism will be operated when the current flow is in one direction and only a part will be operated when the flow is in the opposite direction.

5. In a time indicating machine, the combination of a time mechanism, a magnet, an armature therefor for controlling the operation of the time mechanism, the said magnet being adapted to be attracted at each energization of the magnet, a cut-out device for operatively disconnecting or connecting the said armature and a part of the time mechanism normally controlled by it, a magnet for controlling the cut-out device, a second and polarized armature for the magnet adapted to be attracted by it when the current flow through the magnet is in one direction, but not to be attracted when the flow is in the other direction, and adapted in one of its positions to energize the cut-out control magnet, a circuit through the time mechanism controlling magnet, and reversing means for sending the current through said circuit in one direction or the other, whereby all the time mechanism will be operated when the current flow is in one direction, but only a part will be operated when the flow is in the opposite direction.

6. In a time indicating machine, the combination of a time mechanism and a magnetic means for operating the same, a circuit for controlling said magnetic means, a reversing switch for sending the current through said circuit in one direction or the other, magnetically controlled means for moving the switch from one of its positions to the other and holding it there, a clock-controlled circuit controller for making and breaking the main operating circuit at regular beats of time, and clock-controlled means for operating the switch controlling means at predetermined points of time, but between the operations of the main circuit controller, whereby the direction of current through the magnetic operating means may be changed at predetermined points of time without interfering with the regular actuation of such magnetic operating means.

7. In a time indicating machine, the combination of a time of day indicating mechanism, and an elapsed time indicating mechanism, magnetic means for operating the same, a circuit for controlling said magnetic means, a reversing switch in said circuit, a magnet controlling the switch adapted at each energization to cause the switch to move to one of its extreme positions, means for holding the switch in each of its positions, and a circuit controller for making and breaking the circuit through the switch controlling magnet, the magnetic means being adapted to operate both time mechanisms when the current is in one direction and one only of such mechanisms when the current is in the opposite direction.

8. In a time indicating machine, the combination of a time mechanism, a magnetic means for controlling the operation of the same, a circuit for controlling said magnetic means, a reversing switch in said circuit, magnetically controlled means for moving the switch from one of its positions to the other and holding it there, a circuit controller for making and breaking the main operating circuit at regular beats of time, and means for operating the switch controlling means at predetermined points of time, but between the operations of the main circuit controller, whereby the direction of current through the magnetically operated means may be changed at predetermined points of time without interfering with regular actuation of such magnetically operating means.

9. In a time indicating machine, the combination of a time mechanism, magnetic means for controlling the operation of the same, a circuit for controlling said magnetic means, a reversing switch in said circuit, magnetically controlled means for moving the switch from one of its positions to the other and holding it there, means for actuating the circuit controller at regular beats of time, a second circuit controller adapted to be actuated at regular beats of time between the regular actuations of the main circuit controller, a third circuit controller in series with the second circuit controller, and means adapted at predetermined points of time to move the third circuit controller to operative position and to hold it in such position during two actuations of the second circuit controller, and circuit connections between the second and third circuit controllers and the switch controlling and locking means adapted to be energized when both of the said circuit controllers are in operative position, whereby the time mechanism operating means will be operated at regular beats of time and whereby at predetermined points of time, but between consecutive actuations of the time mechanism operating means, the reversing switch will be thrown to its other position to change the direction of flow of the current but will be thrown back again to its original position between the second of said consecutive actuations and the next succeeding actuation.

10. In a time indicating means, the combination of a time mechanism, a magnet and armature for controlling the operation of the same, said armature being adapted to be attracted at each energization of the magnet, a cut-out device for operatively disconnecting or connecting the said armature and a part of the time mechanism normally controlled by it, a magnet for controlling the cut-out device, a second and polarized armature for the magnet, adapted to be attracted by it by a current in one direction only, and adapted in one of its positions to energize the cut-out controlling magnet, a circuit through the time mechanism controlling magnet, a reversing switch in said circuit, magnetically controlled means for moving the switch from one of its positions to the other and holding it there, a circuit controller for making and breaking the main circuit, a device for actuating the circuit controller at regular beats of time, a second circuit controller adapted to be actuated by said means at regular beats of time between the regular actuations of the main circuit controller, a third circuit controller in series with the second circuit controller, means adapted at predetermined points of time to move the third circuit controller to operative position and to hold it in such position during two actuations of the second circuit controller, and circuit connections between the second and third circuit controllers and the switch controlling means adapted to be energized when both of the said circuit controllers are in operative position, whereby the means controlling the operation of the armature will be actuated at regular beats of time and whereby at predetermined points of time the polarized armature will be actuated to energize the cut-out magnet and operate the cut-out device to connect or disconnect the said means controlling said time mechanism controlling armature and a part of the time mechanism.

11. In a time indicating mechanism, the combination of a time mechanism, a cut-out device adapted to cut the same into or out of operation, and to occupy either an operative or an inoperative position and to be held in position, magnetic means for moving it adapted to be actuated by a current in one direction only, a circuit, a reversing switch therein adapted to be held positively in either of its positions, and magnetic means adapted to be operated at predetermined times and between two successive regular actuations of the time indicating mechanism to throw the reversing switch from one position to the other and to throw it back again to its original position between the last two successive actuations and the next succeeding actuation, whereby the cut-out magnetic means will receive only one magnetic impulse at any of the predetermined points of time, and the time indicating mechanism will be thrown into or out of operation for predetermined portions of time.

12. In a time indicating machine, the combination of time mechanism, a cut-out device adapted to cut the same into and out of operation and to occupy an operative or an inoperative position and to be held in each position, magnetic means for moving it, adapted to be actuated when the current is flowing in one direction only, a circuit, a reversing switch adapted to be held in either of its two positions, means for closing the main circuit at regular beats of time, a switch reversing controlling circuit adapted to be closed at predetermined points of time, and to be kept closed during two successive closings of the main circuit, and a circuit controller therein, whereby the reversing switch will be thrown first into one position and then back to the other.

In testimony whereof, I have signed my name to this specification, in the presence of two subscribing witnesses.

JAMES W. BRYCE.

Witnesses:
 EDWIN SEGER,
 GEO. M. HARRIS.

Copies of this patent may be obtained for five cents each, by addressing the "Commissioner of Patents, Washington, D. C."